Figure 1:
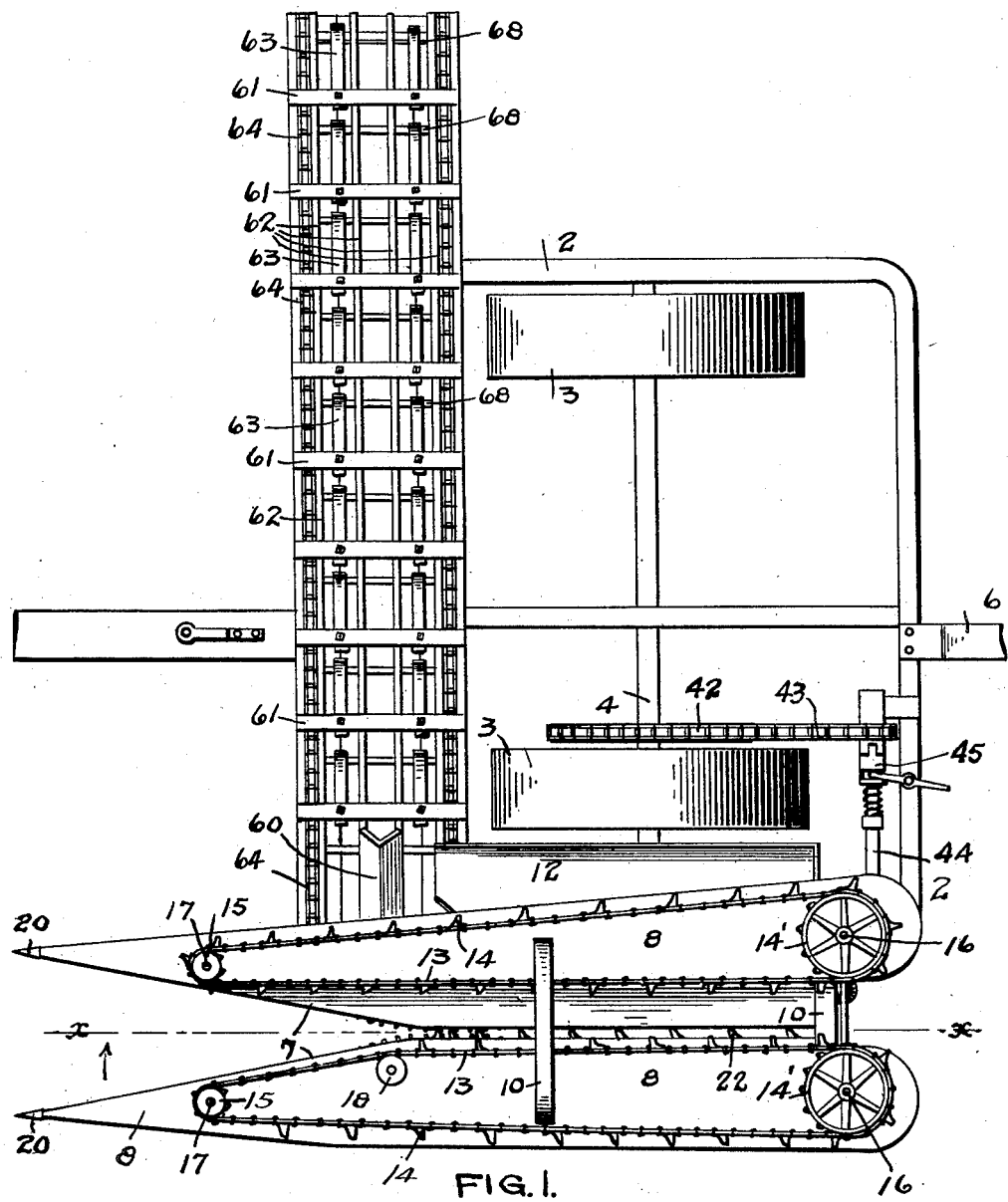

No. 717,153. Patented Dec. 30, 1902.
A. ASPER.
MACHINE FOR GATHERING AND HUSKING CORN.
(Application filed Aug. 19, 1901.)
(No Model.) 5 Sheets—Sheet 1.

WITNESSES
E. G. Staude
M. E. Gooley

INVENTOR
ALBERT ASPER
BY Paul D Hawley
HIS ATTORNEYS

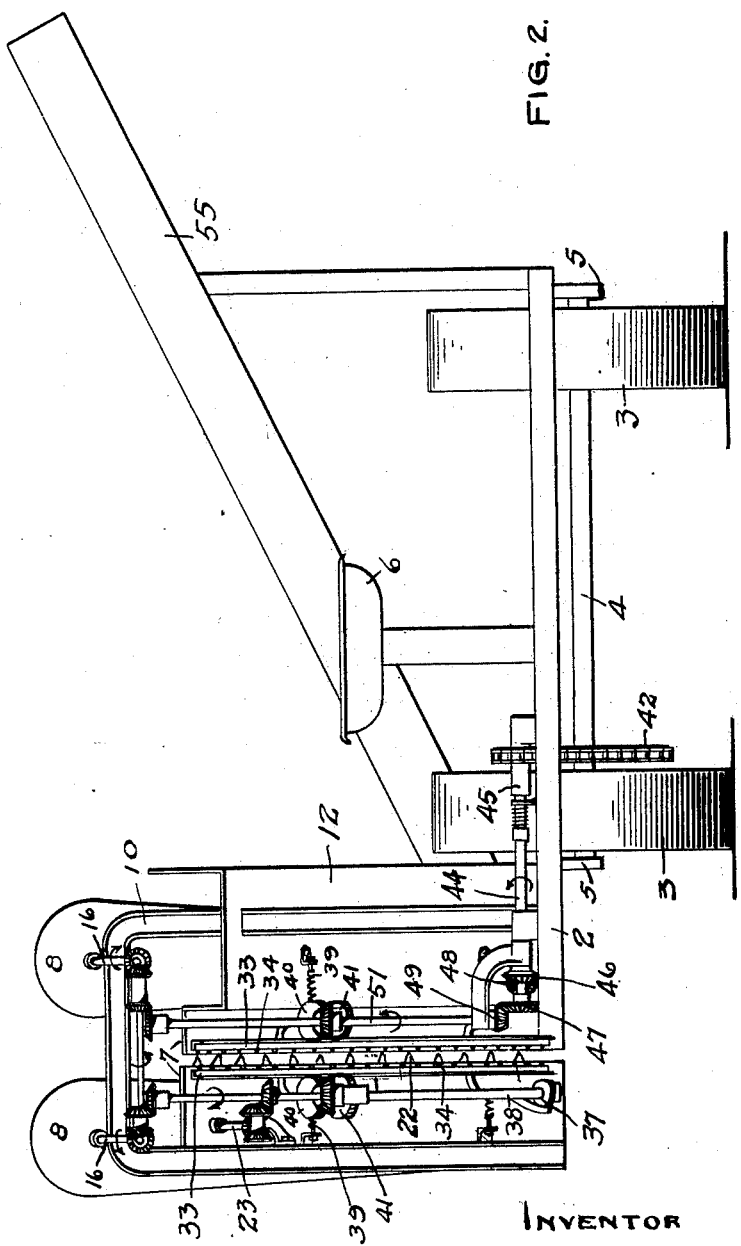

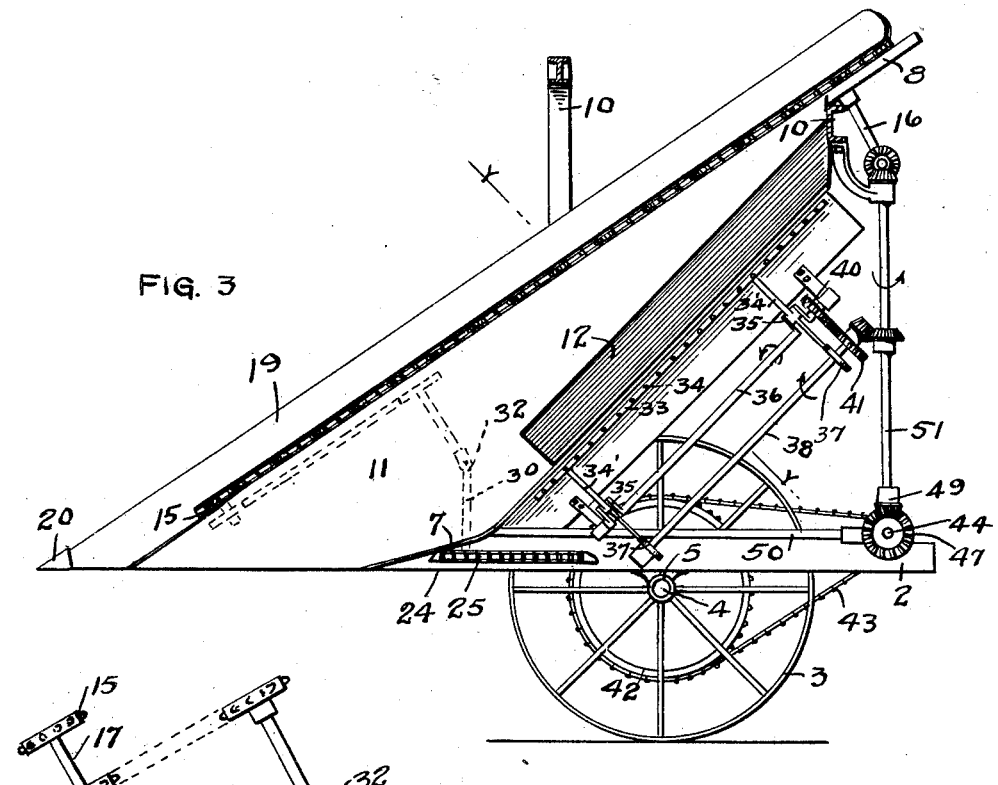
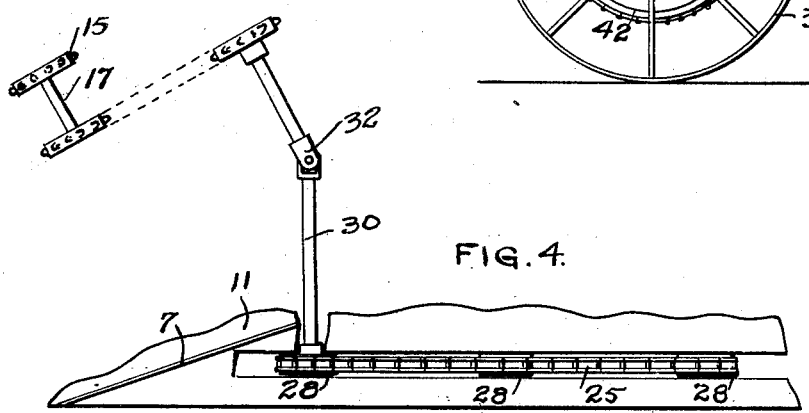
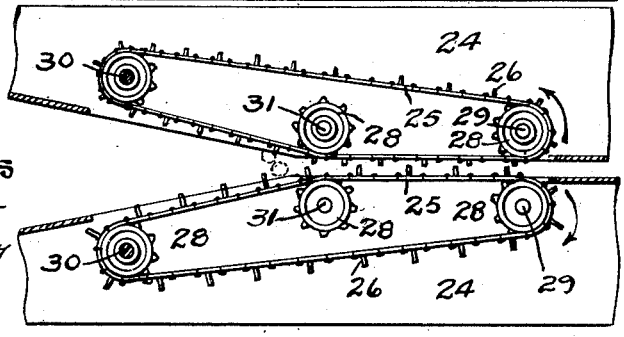

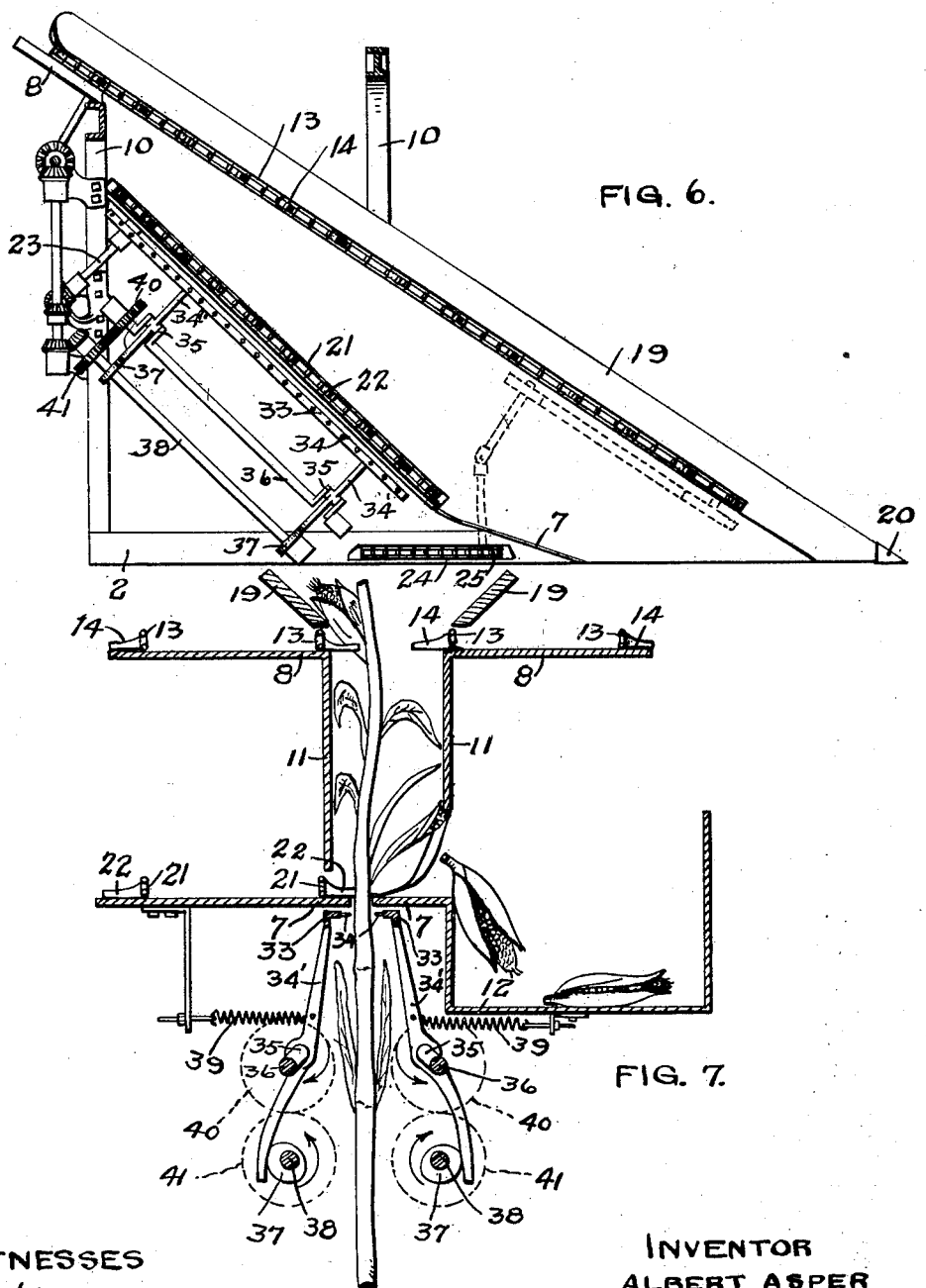

No. 717,153. Patented Dec. 30, 1902.
A. ASPER.
MACHINE FOR GATHERING AND HUSKING CORN.
(Application filed Aug. 19, 1901.)
(No Model.) 5 Sheets—Sheet 5.
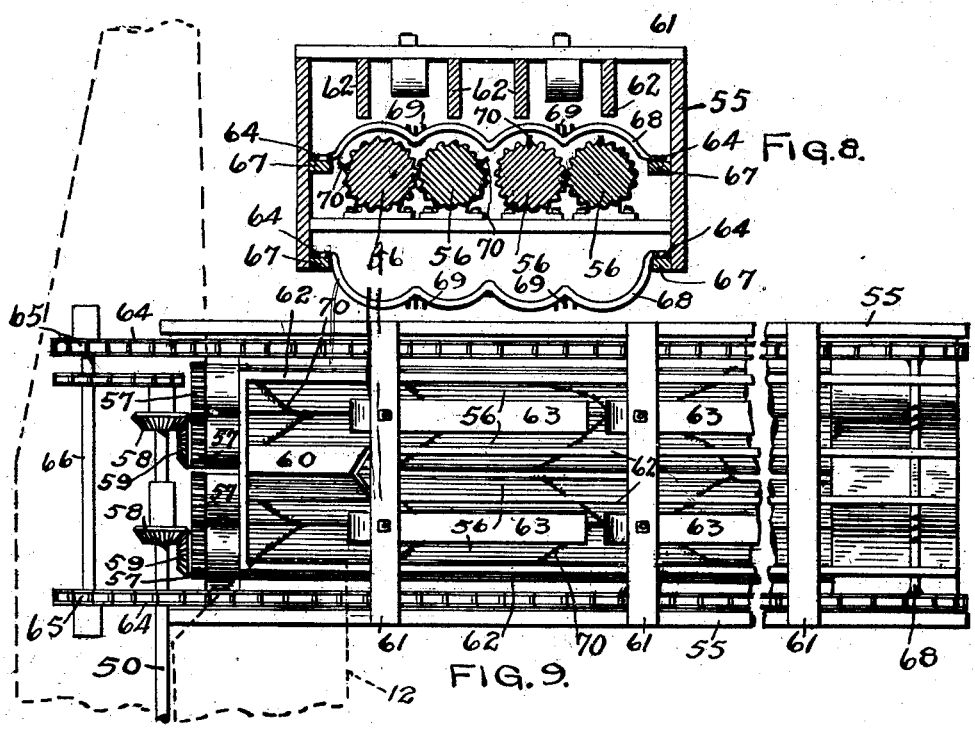
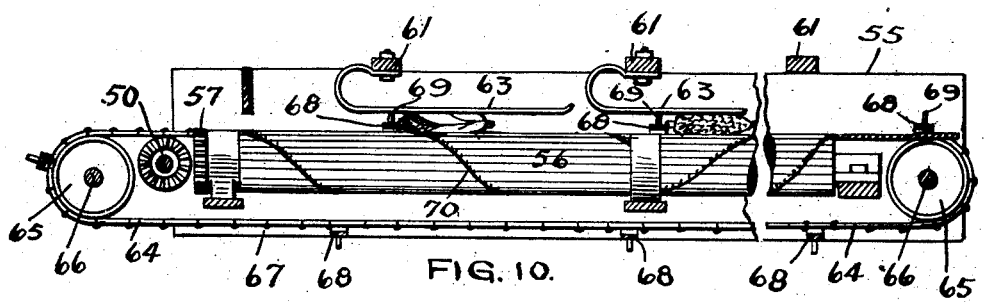
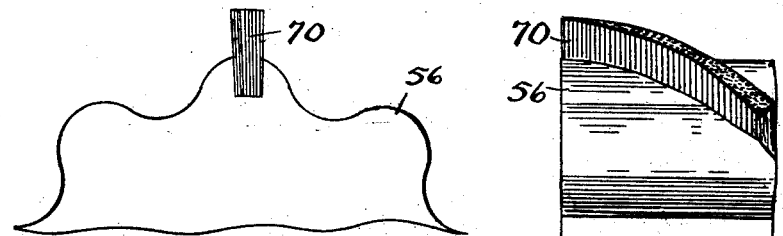
WITNESSES.
INVENTOR
ALBERT ASPER
BY Paul Hawley
HIS ATTORNEYS

UNITED STATES PATENT OFFICE.

ALBERT ASPER, OF LINDEN, SOUTH DAKOTA.

MACHINE FOR GATHERING AND HUSKING CORN.

SPECIFICATION forming part of Letters Patent No. 717,153, dated December 30, 1902.

Application filed August 19, 1901. Serial No. 72,526. (No model.)

*To all whom it may concern:*

Be it known that I, ALBERT ASPER, of Linden, Lincoln county, South Dakota, have invented a certain new and useful Improvement in Machines for Gathering and Husking Corn, of which the following is a specification.

This invention relates to improvements in machines designed to be drawn over a row of corn and which will gather the ears of corn from the stalks, remove the husks, and deliver the ears into a suitable wagon or other receptacle.

The objects I have in view are to provide improved means for removing the ears from the stalk, improved means for husking the ears, improved means for delivering the husked ears to a wagon or other receptacle, and generally to provide a machine of this class that is simple in construction, efficient in operation, and capable of being very rapidly operated.

To these ends the invention consists generally in the constructions and combinations hereinafter described, and particularly pointed out in the claims.

In the accompanying drawings, forming part of this specification, Figure 1 is a plan view of a machine embodying my invention. Fig. 2 is a rear end elevation. Fig. 3 is a vertical section on the line $x\,x$ of Fig. 1 looking in the direction of the arrow. Figs. 4 and 5 are details of the endless carriers that operate upon the cornstalks and of the means for driving the same. Fig. 6 is a section on line $x\,x$ of Fig. 1 looking in the direction opposite to Fig. 3. Fig. 7 is a transverse section of the mechanism taken on line $y\,y$ of Fig. 3. Figs. 8, 9, 10, 11, and 12 are details of the husking and elevating devices.

In all of the drawings, 2 represents the frame of the machine, which may be of any suitable size, shape, or construction. This frame is preferably supported by suitable wheels 3, that are secured upon an axle 4, the frame being carried by the axle by means of brackets or bearings 5. The frame may also be provided with a suitable seat 6 for the driver. At one side of the machine the gathering devices are located. The gathering device consists, essentially, of the plates or boards 7, arranged parallel with each other and having their edges for the greater portion of their length separated only a short distance, thereby forming a narrow slot or space between the two gather boards or plates, of sufficient width to permit the plates to pass on opposite sides of a single cornstalk. The lower ends of the plates are beveled and outwardly inclined, so as to form a V-shaped gathering-space between them. These plates are arranged upon an incline, as illustrated in Figs. 3 and 6, and above them and also arranged at an incline, but at a greater distance apart, are the boards or plates 8, (see Fig. 7,) which serve to support and guide the upper portions of the cornstalks. The inner plates 7 and 8, or those nearest the frame of the machine, are supported directly upon the main frame 2, while the outer plates are supported upon the overhanging or inverted-U-shaped standards 10. By this means the plates 7 and 8 are held rigidly and securely in proper position with an unobstructed space between them. (See Fig. 2.) The upper and lower plates 8 and 7 are preferably connected by the vertical plates 11, and arranged at one side of one of the lower plates is an inclined chute 12, a space being arranged between the plate 11 and the surface of the plate 7 to permit the ears of corn to drop through the chute 12. The space between the plates 11 and the edges of the plates 8 forms a trough or guide for the upper portion of the cornstalks, and in order to cause the stalks to maintain an upright position as the machine advances I provide the endless carriers 13, arranged upon the upper surfaces of the plates 8, said carriers being provided with the projecting lugs or fingers 14 and being arranged to travel from the front to the rear of each of the plates 8 at the edge that is over the plate 11 as the machine is advanced along a row of cornstalks. The carriers 13 are mounted upon sprocket-wheels 14' and 15, and said wheels are arranged upon shafts 16 and 17. The idler-pulley 18 is preferably arranged in connection with one of the carriers 13, so as to cause said carrier to conform to the outline of the plate 8. I prefer to employ the inclined guide boards or plates 19 above the carriers 13, as shown in Fig. 7. These plates are omitted from the plan view in Fig. 1, said plates preferably extending to the lower ends of the plates 8, and the ends of the plates 19 and 8 are preferably provided with suitable metallic guards 20. A carrier 21 is arranged, preferably, upon the upper surface of one of the plates 7, said carrier being provided with fingers 22, and these project beyond the edge of the plate 7 and across the space between the edge of said plate and the edge of the corresponding plate 7. This carrier is mounted upon suitable sprockets and is driven from a shaft 23, and the lower portion of the plate 11 is cut away to permit the carrier to project beyond the edge of the plate 7. Arranged below the plate 7 are the horizontal plates 24, which have a narrow slot or space between them which gradually widens toward the forward ends of said plate. The lower portions of the cornstalk are brought into the narrow space between these plates, and the stalks are held by the edges of the plates as the machine is advanced. Arranged upon each of the plates 24 is an endless carrier 25, having projecting lugs or fingers 26, and these fingers extend over the edges of the plates 24 and partially across the space between said plates. These carriers are mounted on sprocket-wheels 28, arranged upon shafts 29, 30, and 31, (see Fig. 5,) and the shafts 30 are each preferably provided with the universal coupling 32, and each of said shafts is driven by a suitable connection with the carrier 13, already described. The carriers 25 are preferably driven at unequal speed, and as they come in contact with the stalks of corn they tend to move said stalks into a single row in the narrow space between the plates 24 and also in the narrow space between the plates 7.

The mechanism thus far described causes the stalks of corn to be held in an upright position between the plates 7 while the machine is advanced along the row. As the space between the plates 7 and also the space between the plates 24 is only wide enough to admit a single stalk at a time, it follows that the stalks must stand in a single row between the plates as the machine is advanced. The several carriers 13, 21, and 25 aid in keeping the cornstalks in their upright position by forcing them along in the narrow space between the plates, and thus overcoming the friction that would result from the contact of the stalks with the edges of the plate. The plates 7 being close together and standing in an inclined position, it will be seen that if each stalk is given a down movement while it is between the two plates 7 the ears of corn on the stalks that are above the lower ends of the plates 7 and below the upper ends of said plates will be snapped off by coming in contact with said plates. I therefore provide means by which, as the machine advances, the stalks are grasped below the plate 7 and are given a short sharp pull downward, thereby causing any ears that come in contact with the plate 7 to be snapped off from the stalks. For this purpose I employ a combined grasping and pulling device, consisting of a pair of bars 33, each provided with a series of teeth or pins 34, said bars being arranged just below the plates 7 and at opposite sides of the slot or space between said plates. Said bars are arranged parallel with the plates 7, (see Figs. 3 and 6,) and said bars are mounted upon the arms 34', that are pivotally supported upon cranks 35 upon the crank-shaft 36. The arms 34 extend beyond the crank-shafts 36, and each engages a cam 37, arranged upon a suitable shaft 38. Springs 39, connected to the arms 34 and to some stationary part of the machine, serve to hold the lower ends of the arms 34 in contact with the cam 37. The shafts 36 are mounted in suitable bearings upon the frame of the machine, and each of said shafts is provided with a gear 40, engaging a gear 41 upon the cam-shaft 38. The shaft 38 is driven by suitable means, hereinafter described, and the crank-shafts and the eccentrics and springs cause the toothed edges of the bars 33 to first move toward each other, thereby grasping each stalk close to the under side of the plate 7. A quick downward pull is then given to the bars 33, and as the teeth on said bars are now in engagement with the cornstalks said stalks are also given a quick downward movement, and any ears that are close to the upper surface of the plate 7 will be snapped off by contact of the butts of said ears with the upper surfaces of the plates 7. These ears will fall through the slot or opening in the lower part of one of the plates 11 and will drop into the chute 12 and will slide down said chute to the elevator and husker hereinafter described.

I may employ any suitable means or connections for driving the moving devices hereinbefore described. I have illustrated in the drawings means for driving the several devices; but it should be understood that I do not limit myself to these mechanisms, as it is obvious that the same may be varied in many particulars without departing from my invention.

I have here shown a suitable sprocket-wheel 42, arranged upon the axle 4 and connected by a chain 43 with a pinion upon a suitable shaft 44. A clutch 45 is arranged upon said shaft for the purpose of connecting the pinion with the shaft. The shaft 44 is provided with suitable bevel pinions 46 and 47, (see Fig 2,) and these pinions engage the pinions 48 and 49 on the shaft 50 (see Fig. 3) and the vertical shaft 51. (See Figs. 2 and 3.) The shaft 50 drives the elevator hereinafter described, and by suitable connections, consisting preferably of bevel-gears and connecting-shafts, the carriers 13, 21, and 25 are all driven from the shaft 51. It will be understood, of course, that the driving mechanism may be modified or varied in many ways without departing from my invention, it being only necessary that the various moving parts should be properly driven and timed to secure the desired results.

Arranged at right angles to the line of movement of the machine, or preferably so, is a combined elevator and husker. As here shown, the elevator trough or frame 55 is suitably supported upon the frame of the machine, and it has mounted within it and extending lengthwise thereof two pairs of fluted rolls 56. These rolls are mounted in suitable bearings (see Fig. 10) and are provided with pinions 57, and one roll of each pair is driven from the shaft 50 by means of the beveled pinions 58 and 59. The pinions 57 are in mesh with each other, and thereby the rolls of each pair are rotated toward each other. The chute 12 delivers the ears of corn upon the fluted rolls 56. (See Fig. 9.) A guard-plate 60 is arranged over the space between the rolls, so as to prevent the ears from lodging on the space between one roll of one pair and adjacent roll of the other pair. Suitable cross-bars 61 are arranged transversely upon the top of the elevator trough or frame, and longitudinal bars 62 are secured to the under surfaces of the transverse bars 61. (See Fig. 8.) These bars keep the ears from being turned crosswise on the rolls. Secured to the cross-bars 61 are the springs 63, which bear upon the ears of corn while said ears are resting upon and being moved along the fluted rolls. These springs hold the ears closely upon the fluted rolls, thereby giving the fluted rolls an opportunity to grasp and remove all of the loose husks from the ears. For the purpose of moving the ears of corn along the fluted rolls and up the elevator-trough I provide an endless carrier consisting of suitable sprocket-chains 64, mounted upon suitable sprocket-wheels 65 at the ends of the elevators, said sprocket-wheels being supported upon suitable shafts 66. One of the shafts 66 is driven by suitable means from the shaft 50. The carrier-chains extend lengthwise of the elevator-trough and are preferably kept in position by means of longitudinal cleats or ledges 67, upon which said chains rest. These chains are connected by the cross-bars 68, which are preferably of curved form, as shown in Fig. 8, conforming substantially to the upper surface of a transverse section of the husking-rolls. The bars 68 are preferably provided with pins 69, which prevent the ears from getting over the bars. One of each pair of spiral fluted rolls 50 is preferably provided with a spiral groove, in which is arranged a section of wire brush 70. The other one of the pair is provided with a spiral groove corresponding with this brush. A part of the length of each roll is preferably provided with a groove extending in one direction (left-hand thread) and the other parts with a groove extending in the opposite direction, (right-hand thread.) The result of this is that as the ears are carried along on the rolls the spiral brush on one part of the roll tends to loosen the husks and turn them from the tip of the ear to the butt when one end of the ear is traveling first, and the other section of the roll tends to accomplish this result when the other end of the ear is traveling first. As the ears are fed down the chute and upon the rolls some of them will arrange themselves with their tips forward and others with their butts forward. With the described arrangement of the spiral brushes the husks will be loosened and stripped or turned backward from the tips to the butts regardless of the way the ears are moving. As soon as the husks are loosened they will be grasped by the fluted rolls and will be stripped off from the ear. When the ears of corn reach the upper end of the combined husker and elevator, they will fall into a wagon that is moved along, so as to be at all times under the upper end of the elevator and in position to receive the ears of corn from said elevator.

The operation of the machine will be readily understood from the foregoing detailed description of the construction. The machine is drawn along a row of corn, and the stalks being held in an upright position by the mechanism described are received one at a time into the narrow space between the inclined plates 7. They are kept in an upright position as the machine advances, and the ears of corn are snapped off the stalks and fall into the chute, down which they slide upon the elevator and husker. In the combined husker and elevator the husks are removed as the ears are moved along, and when they reach the upper end of the elevator they drop into the wagon or receptacle arranged below said upper end of the elevator.

It will be readily seen that the details of the construction may be varied in many particulars without departing from my invention. Hence I do not limit myself to the details herein shown and described.

I claim as my invention—

1. In a corn-husker, the combination with a suitable frame, of the inclined gather-plates arranged with a narrow space between them, and means for grasping the cornstalks below said plate and pulling them downward to bring the butts of the ears in contact with said plates and snap the ears from the stalks and then release the grip on the stalk, substantially as described.

2. The combination with the inclined gather-plates arranged with a narrow space between them, of means for retaining the cornstalks in an upright position as the machine advances so as to bring the stalks into the space between said plates, and means for grasping the cornstalks below said plates and pulling them downward to bring the butts of the ears in contact with said plates and snap the ears from the stalks and then release the grip on the stalks, substantially as described.

3. The combination with the inclined gather-plates arranged with a narrow space between them, of an endless carrier arranged parallel with said plate and provided with lugs or projections extending across the space between said plates, means for moving said carrier, and means for grasping the cornstalks below said plates and pulling them downward to bring the butts of the ears in contact with said plates and snap the ears from the stalks, and then release the grip on the stalks, substantially as described.

4. The combination with the inclined gather-plates arranged with a narrow space between them, of an inclined chute arranged in proximity to said plates, and means for grasping the cornstalks below said plates and drawing them downward to snap the ears from the stalks and then release the grip on the stalks, substantially as described.

5. The combination with the inclined gather-plates 7 arranged with a narrow space between them, of the inclined gather and guide plates 8 arranged at a distance above the plates 7, upright plates connecting the upper and lower sets of plates, and means for holding the cornstalks in an upright position between said lower and upper plates as the machine is moved along over a row of corn, substantially as described.

6. The combination with the inclined gather-plates 7 arranged with a narrow space between them, of the inclined gather and guide plates 8 arranged at a distance above the plates 7, upright plates connecting the upper and lower sets of plates, endless carriers arranged parallel with the gather-plates and provided with lugs or projections extending across the space between said plates, and means for moving said carriers and thereby holding the stalks in an upright position as the machine is moved along a row of corn, substantially as described.

7. The combination, with the inclined gather-plates arranged with a narrow space between them, of toothed bars arranged below and parallel with said plates, and means for causing said bars to grasp the cornstalks and pull them downward through the space between said plates, substantially as described.

8. The combination, with the inclined gather-plates, of the toothed bars arranged below said plates, the crank-shaft supporting said bars, means for rotating said crank-shaft, and suitable cams controlling the inward and outward movement of said bars, substantially as described.

9. The combination with the inclined gather-plates 7 arranged with a narrow space between them, of the toothed bars 33 arranged below and parallel with said plates, arms supporting said bars, crank-shafts upon which said arms are mounted and whereby said bars are given an upward and downward movement, and suitable cams controlling the movements of said bars toward and from each other, substantially as described.

10. The combination, with the elevator-frame, of the fluted husking-rolls provided with the spiral brushes, and means for detaching the ears from the stalks preparatory to their delivery to the husking-rolls, substantially as described.

11. The combination, with the elevator-frame, of the fluted husking-rolls, one of each pair provided with oppositely-inclined spiral brushes, and the other of each pair provided with spiral grooves corresponding with the spiral brushes, and means for detaching the ears from the stalks preparatory to their delivery to the husking-rolls, substantially as described.

12. The combination, with the elevator-frame, of the fluted husking-rolls, spiral brushes upon said rolls, and the carrier for moving the ears of corn along said rolls, and means for detaching the ears from the stalks preparatory to their delivery to the husking-rolls, substantially as described.

13. The combination, with the elevator-frame, of the fluted husking-rolls mounted therein, spiral brushes secured upon said rolls, an endless carrier for moving the ears of corn along said rolls, springs arranged above and extending longitudinally of said rolls, and means for detaching the ears from the stalks preparatory to their delivery to the husking-rolls, substantially as described.

14. The combination, with the fluted husking-rolls 56 provided with the spiral brushes 70, of the springs 63 arranged above said rolls and extending longitudinally thereof, and means for detaching the ears from the stalks preparatory to their delivery to the husking-rolls, substantially as described.

15. The combination, with the fluted husking-rolls, of the carrier provided with the curved bars 68 extending across said rolls, and means for detaching the ears from the stalks preparatory to their delivery to the husking-rolls, substantially as described.

16. The combination, with the fluted husking-rolls, of the carrier provided with the curved bars 68 extending across said rolls, the pins 69 arranged in said bars, and means for detaching the ears from the stalks preparatory to their delivery to the husking-rolls, substantially as described.

In testimony whereof I have hereunto set my hand, this 26th day of June, 1901, at Linden, South Dakota.

ALBERT ASPER.

In presence of—
A. HELGERSON,
A. B. CARLSON.